(12) United States Patent
Bosik et al.

(10) Patent No.: US 7,046,783 B1
(45) Date of Patent: May 16, 2006

(54) SEAMLESS RE-DIRECTION OF CALLS BETWEEN HOME AND MOBILE TELEPHONES

(75) Inventors: Barry S. Bosik, Marlboro, NJ (US); Amit Garg, Howell, NJ (US); Rajeev B. Patil, Holmdel, NJ (US); Jeffrey L. Tuttle, Hazlet, NJ (US)

(73) Assignee: AT&T Corp., New York, NY (US)

( * ) Notice: Subject to any disclaimer, the term of this patent is extended or adjusted under 35 U.S.C. 154(b) by 289 days.

(21) Appl. No.: 10/068,480

(22) Filed: Feb. 7, 2002

(51) Int. Cl.
*H04Q 7/38* (2006.01)
*H04Q 11/00* (2006.01)

(52) U.S. Cl. .............................. 379/211.02; 379/88.2; 379/207.02; 455/414.1

(58) Field of Classification Search ................ 455/417, 455/426.1, 462, 461, 412.1; 379/59
See application file for complete search history.

(56) References Cited

U.S. PATENT DOCUMENTS

| | | | |
|---|---|---|---|
| 5,526,403 A * | 6/1996 | Tam ....................... | 455/426.1 |
| 5,727,057 A | 3/1998 | Emery et al. .......... | 379/201.07 |
| 5,901,359 A * | 5/1999 | Malmstrom .............. | 455/461 |
| 5,933,774 A * | 8/1999 | Bertocci .................. | 455/417 |
| 5,978,684 A * | 11/1999 | Cook et al. ............... | 455/462 |
| 6,072,865 A | 6/2000 | Haber et al. ............ | 379/211.02 |
| 6,141,545 A * | 10/2000 | Begeja et al. ............. | 455/417 |
| 6,266,539 B1 | 7/2001 | Pardo ..................... | 455/556.2 |
| 6,314,303 B1 | 11/2001 | Phipps ..................... | 455/555 |
| 6,321,085 B1 | 11/2001 | Achour et al. ........... | 455/435.2 |
| 6,628,947 B1 | 9/2003 | Yu et al. | |
| 2001/0003706 A1 * | 6/2001 | Warburton et al. ........ | 455/417 |
| 2001/0031645 A1 * | 10/2001 | Jarrett ..................... | 455/552 |
| 2003/0181202 A1 * | 9/2003 | Link et al. ................ | 455/417 |

\* cited by examiner

*Primary Examiner*—Fan Tsang
*Assistant Examiner*—Lisa Hashem

(57) ABSTRACT

A method is described for providing wired line telephone and mobile telephone cross-usage comprising the steps of de-activating call forwarding of incoming mobile telephone calls to a subscriber's home wired line telephone and for activating call forwarding of incoming wired line telephone calls to the subscriber's mobile telephone upon removal of the mobile telephone from a customer premises equipment (CPE) cradle. The method further provides for activating call forwarding of incoming mobile telephone calls to the subscriber's home wired line telephone and for de-activating call forwarding of incoming wired line telephone calls to the subscriber's mobile telephone upon placement of the mobile telephone into said CPE cradle. A customer premises equipment (CPE) cradle for providing home wired line and mobile telephone cross-usage has a conventional wired line telephone jack, an AC in plug/port, at least one connector pin, at least one charging pin, a detection switch, a support for the mobile telephone, a display and buttons unit, a charging mechanism, a detection switch and a programmable module.

8 Claims, 4 Drawing Sheets

US 7,046,783 B1

SEAMLESS RE-DIRECTION OF CALLS BETWEEN HOME AND MOBILE TELEPHONES

FIELD OF THE INVENTION

The present invention relates to an apparatus and method for wired line and wireless telephone cross-usage. Specifically, the present invention relates to the seamless (transparent and automatic) re-direction of telephone calls destined for a mobile telephone to a subscriber's wired line telephone when the subscriber is, for example, at home and vice versa when the subscriber is, for example, away from home. A subscriber's wired line telephone may be a conventional wired line telephone or a portable telephone that uses a base station or any equivalent telephone that uses or relies on a circuit-switched connection to a Public Switched telephone Network (PSTN).

BACKGROUND OF THE INVENTION

The voice quality of a mobile telephone is acceptable when on the road but it is not currently up to the same standard as that of a wired line telephone. Additionally, there is no charge for answering telephone calls on a wired line telephone whereas there is often a charge for answering incoming calls on a mobile telephone. For these reasons, subscribers may prefer to that incoming calls to their mobile telephones be received on their wired line telephone if they are at home. Conversely, subscribers may prefer to receive calls to their wired line telephone on their mobile telephone if they are away from home.

SUMMARY OF THE INVENTION

The present invention uses a new device connected to a conventional wired line telephone or to a base station of a portable telephone. This new customer premises equipment (CPE) would also serve as a cradle to charge the mobile telephone.

That is, the present invention is capable of forwarding all calls to a subscriber's wired line telephone or mobile telephone based on the presence or absence of the subscriber's mobile phone in the CPE cradle.

It is, therefore, an object of the present invention to provide an apparatus and automatic and transparent method to provide wired line and mobile telephone cross-usage.

It is a further object of the present invention to provide an apparatus and method to re-direct telephone calls from a mobile telephone to a wired line telephone where the mobile telephone subscriber is located without requiring any user action. This redirection will provide a higher quality connection at a lower price.

It is yet another object of the present invention to permit subscribers to re-direct telephone calls from their wired line telephone to their mobile telephones if they are away from home.

BRIEF DESCRIPTION OF THE DRAWINGS

The present invention is best described with reference to the detailed description and the following figures, where.

DETAILED DESCRIPTION OF THE PREFERRED EMBODIMENTS

The placement or removal of a mobile telephone from a mobile telephone cradle connected to a wired line telephone or base station of a portable telephone automatically and transparently activates the re-direction functionality as follows:

Removing the mobile telephone from the CPE cradle of the present invention triggers one or both of the following events depending upon the feature package selected by the subscriber:
  1. De-activate call forwarding on the mobile telephone in order to start receiving incoming mobile telephone calls on the mobile telephone.
  2. Activate call forwarding on the home wired line telephone in order to start receiving wired line telephone calls on a mobile telephone.

Placing the mobile telephone on the CPE cradle of the present invention triggers one or both of the following events depending upon the feature package selected by the subscriber:
  1. De-activate call forwarding on the home wired line telephone in order to start receiving wired line telephone calls on the home wired line telephone.
  2. Activate call forwarding on the mobile telephone in order to start receiving mobile telephone calls on the home wired line telephone.

To activate or de-activate the home wired line telephone call forwarding, the CPE cradle seizes the home wired line by going off-hook and places a call to the subscriber's Local Exchange Carrier (LEC) end office (EO), typically a central office (CO). The CPE cradle communicates the key sequences and call forwarding telephone number that causes the LEC's call forwarding feature to be activated or de-activated. The CPE cradle then hangs up.

To activate or de-activate the mobile telephone call forwarding, the CPE cradle goes off-hook and places a telephone call to a Call Forwarding Activation De-Activation Server (CFADS) that resides within the mobile network. The CFADS will be provisioned with subscriber information (including the subscriber's ANI and MIN) at the time of subscription. The CFADS uses the "dialed number" and automatic number identification (ANI) from an ISUP/Q.931 message to activate/de-activate call forwarding on the appropriate mobile identification number (MIN). CFADS will always pass "ringback" to the LEC. The LEC will pass "ringback" to the CPE cradle. The CPE cradle will terminate the telephone call upon receipt of the "ringback". Thus, there will be no billed usage associated with the calls placed by the CPE cradle.

Figure 1:
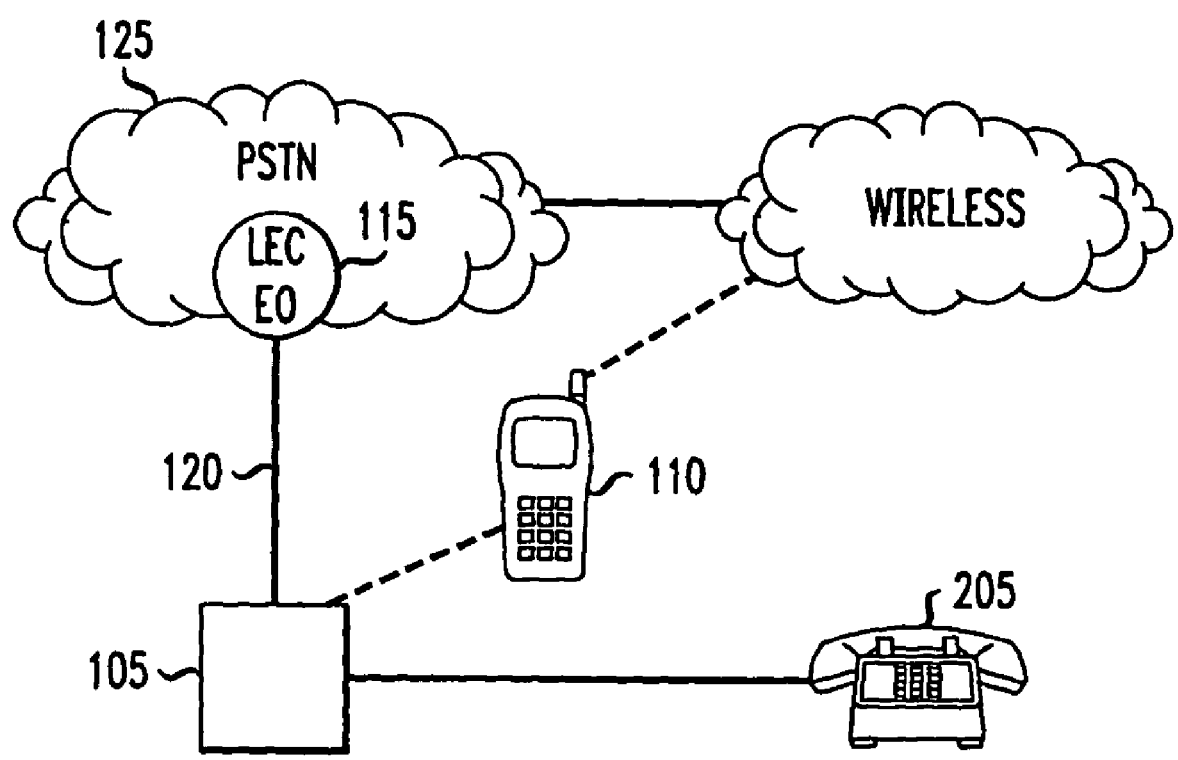
FIG. 1 depicts activation and de-activation of call forwarding to a mobile telephone.

Three exemplary embodiments will now be described. A first embodiment of the present invention is directed toward the activation and de-activation of call forwarding to a mobile telephone. FIG. 1 depicts activation of call forwarding to a mobile telephone. A CPE cradle 105 of the present invention is connected as an extension to the home wired line telephone. The CPE also has an integral cradle to charge the mobile telephone. Removing the mobile telephone from the CPE cradle of the present invention triggers the CPE cradle to activate call forwarding, a LEC feature. The CPE cradle detects the absence of the mobile telephone 110 once it has been removed from the CPE cradle. The CPE cradle seizes the home wired line 120 by going off-hook and placing a telephone call to the subscriber's LEC EO 115 within the public switched telephone network (PSTN) 125. The CPE cradle communicates the key sequences and call forwarding telephone number that causes the LEC's existing call forwarding feature to be activated. The CPE cradle then hangs up, having activated call forwarding to the mobile telephone. All calls for the home wired line telephone will now be forwarded to the mobile telephone by the LEC EO.

FIG. 1 also shows the de-activation of call forwarding to the mobile telephone 110. Placing the mobile telephone 110 into the CPE cradle 105 triggers the CPE cradle to de-activate call forwarding for the home wired line telephone 205, again an existing LEC feature. When the mobile telephone unit is placed on the CPE cradle of the present invention, the CPE cradle detects that the mobile handset is in the CPE cradle. The CPE cradle then seizes the home wired line 120 by going off-hook and places a telephone call to the LEC EO 115 within the PSTN 125. The CPE cradle communicates the key sequences and call forwarding telephone number that causes the LEC's existing call forwarding feature to be de-activated. The CPE cradle then hangs up, having de-activated call forwarding to the mobile telephone. All calls for the home wired line telephone will now ring at the home wired line telephone. The CPE cradle will also charge the mobile telephone.

Figure 2:
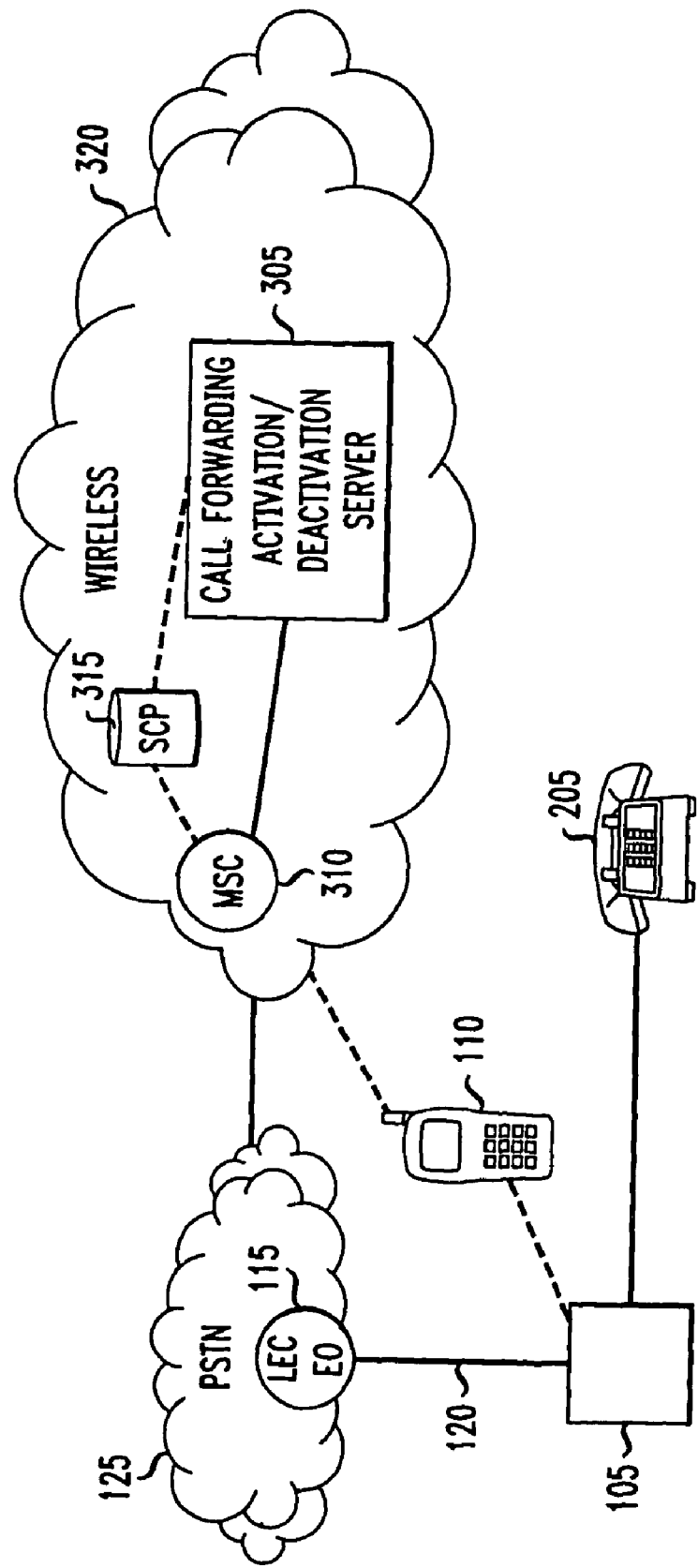
FIG. 2 shows activation and de-activation of call forwarding to the home wired line telephone.

A second exemplary embodiment of the present invention is directed to activation and de-activation of call forwarding to a home wired line telephone. FIG. 2 shows activation of call forwarding to the home wired line telephone 205. A CPE 105 of the present invention is connected as an extension to the home wired line telephone. The CPE also has an integral cradle to charge the mobile telephone. The CPE cradle 105 is programmable and is programmed to dial a pre-specified telephone number when a mobile telephone/handset 110 is placed in the CPE cradle 105 and another pre-specified telephone number when the mobile handset is removed from the CPE cradle. The CPE cradle detects the presence of the mobile handset when the mobile handset is placed into the CPE cradle. Detection of the presence of the mobile handset in the CPE cradle triggers the CPE cradle to seize the wired line 120 and place a call to the pre-specified telephone number to a CFADS 305 within a wireless network 320 to activate call forwarding to the home wired line telephone 205. CFADS receives the telephone call from the CPE cradle on the activation number and, using the ANI, the CFADS will activate call forwarding for the corresponding MIN. The CFADS will accomplish this by using the ANI to perform a look-up for the MIN provisioned to be forwarded to the ANI and activate call forwarding for that MIN. The Mobile Switching Center (MSC) 310 will query the Service Control Point (SCP) 315 to complete mobile telephone calls such that incoming mobile telephone calls will be forwarded to the home wired line telephone.

FIG. 2 also shows de-activation of call forwarding to the home wired line telephone. Removing the mobile telephone 110 from the CPE cradle 105 results in the detection by the CPE cradle of the absence/removal of the mobile telephone from the CPE cradle. The detection of the absence of the mobile telephone from the CPE cradle triggers the CPE cradle to dial a pre-specified number to a CFADS 305 to de-activate call forwarding via the wired line 120 and the PSTN 125. The CFADS will receive the call on the de-activation telephone number and using the ANI will de-activate call forwarding for the corresponding MIN. The CFADS located within the wireless network 320 service provider's equipment will accomplish this by using the ANI to lookup the MIN provisioned to be forwarded to the ANI and will de-activate call forwarding for that MIN. The MSC 310 will query the SCP 315 to complete all mobile telephone calls such that incoming calls will be completed to the mobile telephone.

Figure 3:
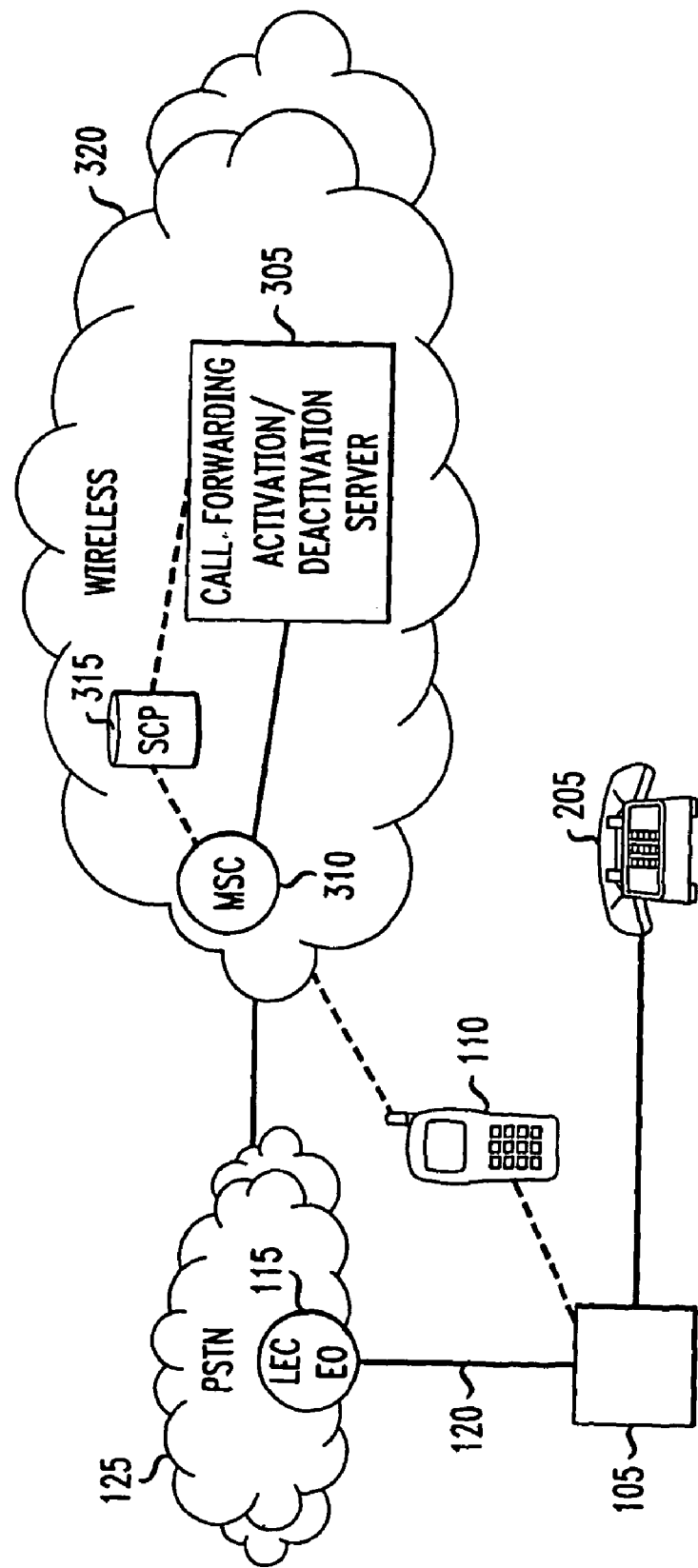
FIG. 3 depicts all telephone calls to a subscriber's mobile telephone, and home wired line telephone.

The third exemplary embodiment of the present invention is for activating and de-activating call forwarding to the subscriber's mobile telephone and for activating/de-activating call forwarding to the subscriber's home wired line telephone. FIG. 3 depicts all telephone calls to a subscriber's mobile telephone 110. A CPE of the present invention is connected as an extension to the home wired line telephone. The CPE also has an integral cradle to charge the mobile telephone. Upon the removal of the mobile handset from the CPE cradle 105, the CPE cradle detects the absence of the mobile handset from the CPE cradle. The CPE cradle then seizes the home wired line 120 by going off-hook and dialing a pre-specified telephone number a CFADS 305 to de-activate call forwarding to the home wired line telephone. The CFADS receives the telephone call on the de-activation number, and using the ANI, de-activates call forwarding for the corresponding MIN. The CFADS accomplishes this by using the ANI to lookup the MIN provisioned to be forwarded and de-activates call forwarding for that MIN. The CPE cradle then places a telephone call to the subscriber's LEC EO 115 within a PSTN 125. The CPE cradle communicates the key sequences and call forwarding telephone number that causes the LEC's existing call forwarding feature to be activated. The CPE cradle then hangs up, having activated call forwarding to the mobile telephone. All calls for the home wired line telephone will now be forwarded to the mobile telephone by the LEC EO.

FIG. 3 also depicts all telephone calls to a subscriber's home wired line telephone. Upon the placement of the mobile handset 110 into the CPE cradle 105, the CPE cradle detects the presence of the mobile handset 110 in the CPE cradle. The CPE cradle then seizes the home wired line 120 and places a telephone call to the LEC EO 115 within a PSTN 125 to de-activate call forwarding from the home wired line telephone 205 to the mobile telephone. The CPE cradle then places a telephone call to a pre-specified number to a CFADS 305 within a wireless network 320 to activate call forwarding of the mobile telephone to the home wired line telephone. The CFADS will receive the telephone call on the activation number and using the ANI lookup the MIN provisioned for call forwarding and activate call forwarding for the corresponding MIN. The MSC 310 will query the SCP 315 to complete mobile telephone calls and all incoming mobile telephone calls will be completed to the home wired line telephone.

Figure 4:
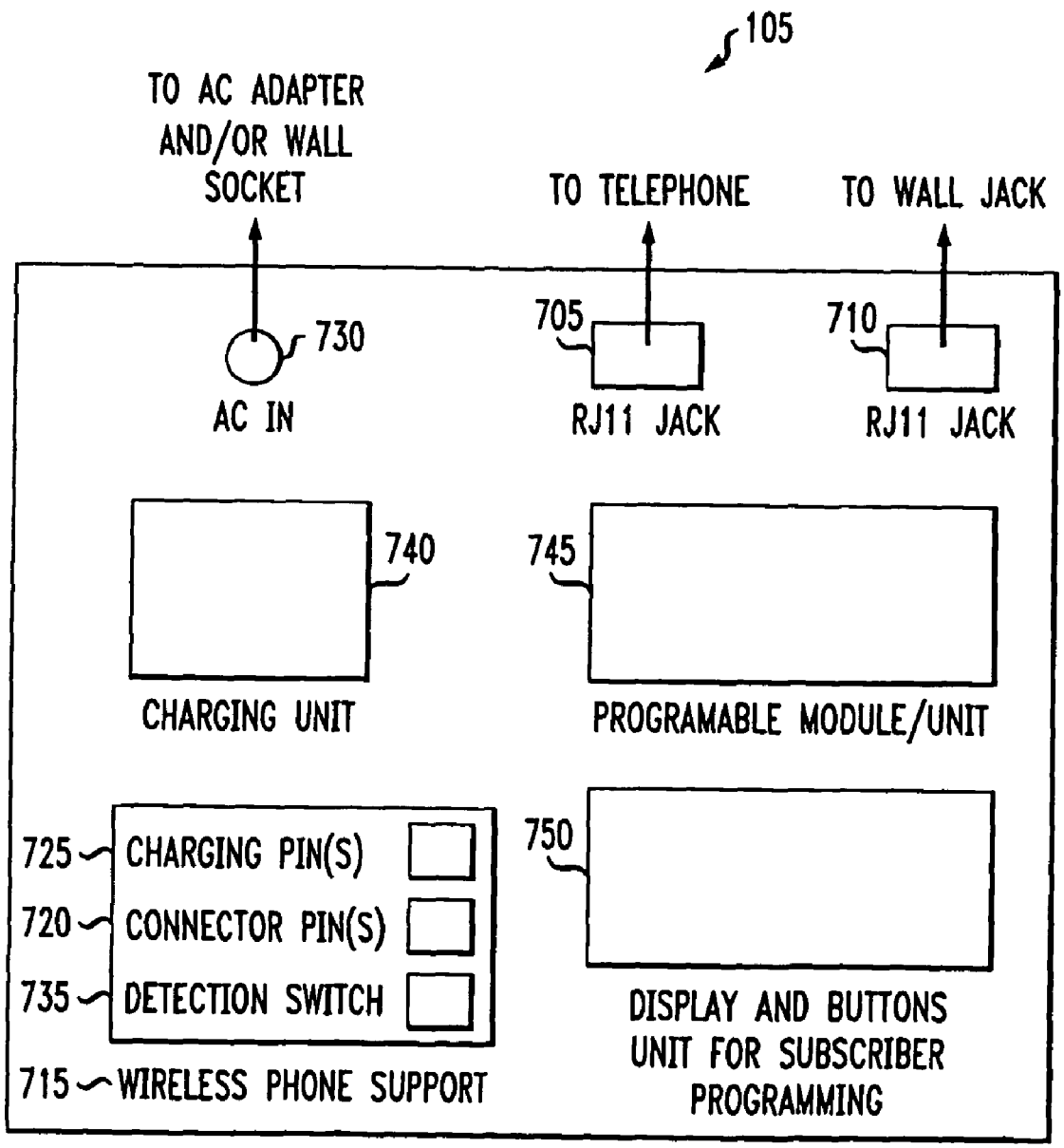
FIG. 4 depicts the CPE cradle.

FIG. 4 is a block/logical diagram of the CPE cradle of the present invention. The CPE cradle 105 of the present invention provides for home wired line and mobile telephone cross-usage automatically and transparently and has a housing made of any material capable of being formed such that at least one surface is flat so that said housing may be placed on a surface adjacent to the home wired line telephone. The CPE cradle is interposed between a conventional wired line telephone and a conventional telephone receptacle by the CPE cradle having at least one conventional telephone jack 710. The CPE cradle could be plugged into a conventional telephone wall jack. No conventional wired line telephone needs to be co-located with the CPE cradle of the present invention. In the alternative, two conventional telephone jacks could be used. The conventional wired line telephone could be disconnected from, for example, a conventional telephone wall jack and the CPE cradle plugged into the conventional telephone wall jack and the CPE cradle then plugged into the conventional wired line telephone where the conventional wired line telephone was previously connected to the conventional telephone wall jack. The CPE cradle would also support the mobile telephone 715 when the mobile telephone is inserted into the CPE cradle. The mobile telephone would be positively connected to the CPE cradle by means of at least one but preferably a plurality of connector pins 720. The CPE cradle also has at least one charging pin 725 which is the means by which the mobile telephone is charged when the AC cord attached to the CPE cradle at "AC in" plug 730 is plugged into an adapter which is plugged into a wall outlet for use with household current or an adapter (not shown) may be contained within the CPE cradle so that the CPE cradle may be plugged directly into an AC outlet. The CPE further having a detection switch 735 by which the insertion or removal of the mobile telephone is sensed and the activation/de-activation process(es) then initiated. The detection switch thus has two positions—one if the mobile telephone is in the CPE cradle and a second position when the mobile telephone has been removed from the CPE cradle; and based upon the position of the detection switch, activation/de-activation of call forwarding is initiated. The CPE cradle further has within the CPE cradle a charging mechanism 740 known in the art.

The CPE cradle further has a programmable module/unit 745 for effecting activation and/or de-activation of call forwarding as selected by a subscriber when the subscriber subscribed to certain services and features. The programmable module is programmable by service personnel at the point of sale, or by the subscriber. There are three areas of programmability. The first area of programmability is the programming of the CFADS such that it knows the MIN that is associated with the subscriber. When the subscriber's CPE cradle calls in to the CFADS, the CFADS retrieves the calling number ANI and uses that as the subscriber's number to do the lookup of the associated MIN. This programming is performed by the subscriber upon subscription to the call forwarding service of the present invention, for example, by calling a number and then stepping through a touch-tone menu system from a phone to specify their home number and their wireless/mobile number.

The second area of programmability is the programming of the CPE cradle for the number to call when the CPE cradle calls the CFADS for activating/deactivating mobile telephone call forwarding. Two telephone numbers are required, one for activation of call forwarding and one for de-activation of call forwarding. These numbers can be pre-programmed into the CPE cradle by the service provider, and they should not change. If, however, one or both of these numbers do change, then the subscriber will be given instructions on how to program the new numbers into the CPE cradle themselves or, in the alternative, the CPE cradle may be returned to the point of sale or a service provider's ability to be reprogrammed or upgraded. This same procedure may be followed in the event of a software upgrade.

The third area of programmability is the programming of the CPE cradle for the number to call when the CPE cradle calls the local switch for home wired line call forwarding and for the touch-tone sequence of entering the forward-to number. Normally this touch-tone sequence is done by a live person; but in the case of the present invention, the CPE cradle will actually navigate and enter the tones. So, for home wired line call forwarding, the subscriber needs to program the number to call and the key sequence. Instructions will tell a subscriber how to do this, but the subscriber does it.

The Display and Button unit 750 will, for example, be like an upscale caller identification unit or, for example, like a digital watch, where there are two to four buttons that let the subscriber navigate through the programming elements and go up or down (scroll) through numbers to get the right number and then move along to the next number.

It is important to note that the re-direction (call forwarding) functions of the CPE cradle of the present invention are automatic and transparent. The programming of the CPE cradle to set-up the service as described above is, however, not automatic or transparent. The programmable module/unit comprises hardware or software or firmware or any combination thereof. The programmable module may also be an application specific integrated circuit (ASIC) and/or a filed programmable gate array (FPGA) and/or either ASICs or FPGAs or both of these in any combination with or without conventional software or hardware or firmware.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What we claim is:

1. A method for providing wired line telephone and mobile telephone cross-usage comprising:
    a) activating call forwarding of incoming wired line telephone calls to a subscriber's mobile telephone upon removal of said mobile telephone from a customer premises equipment (CPE) cradle; and
    b) de-activating call forwarding of incoming wired line telephone calls to the subscriber's mobile telephone upon placement of said mobile telephone into said CPE cradle,
    wherein activating call forwarding of incoming wired line telephone calls to said subscriber's mobile telephone further comprises:
        detecting by said CPE cradle an absence of the mobile telephone upon removal of said mobile telephone from said CPE cradle;
        seizing by said CPE cradle of a wired line by going off-hook;
        placing a telephone call to a subscriber's Local Exchange Carrier (LEC) end office (EO);
        communicating by said CPE cradle key sequences and a call forwarding telephone number that causes the LEC's existing call forwarding feature to be activated; and
        hanging up by said CPE cradle after having activated call forwarding to the mobile telephone,
        whereby incoming wired line telephone calls are thereupon forwarded to the mobile telephone by means of said LEC.

2. The method according to claim 1 further comprising:
    activating call forwarding of incoming mobile telephone calls to a subscriber's wired line telephone upon placement of said mobile telephone into a customer premises equipment (CPE) cradle; and
    de-activating call forwarding of incoming mobile telephone calls to the subscriber's wired line telephone upon removal of said mobile telephone from said CPE cradle.

3. The method according to claim 2, wherein said activating call forwarding of incoming mobile telephone calls to said subscriber's wired line telephone further comprises:

detecting by said CPE cradle a placing of said mobile telephone in said CPE cradle when said mobile telephone is placed in said CPE cradle;

seizing by said CPE cradle a wired line;

placing by said CPE cradle a telephone call to a pre-specified activation telephone number to a Call Forwarding Activation De-Activation Server (CFADS) to activate call forwarding to the wired line telephone;

receiving by CFADS said telephone call from said CPE cradle on said pre-specified activation telephone number;

activating call forwarding of incoming calls to said mobile telephone to said wired line telephone using an Automatic Number Identification (ANI) by CFADS; and hanging up said wired line by said CPE cradle, having activated mobile telephone call forwarding to the home.

4. The method according to claim 2, wherein de-activating call forwarding of incoming mobile telephone calls to a subscriber's wired line telephone further comprises:

detecting by said CPE cradle a removal of said mobile telephone from said CPE cradle;

seizing a wired line by said CPE cradle;

dialing by said CPE cradle a pre-specified de-activation telephone number to a Call Forwarding Activation De-Activation Server (CFADS) in order to de-activate call forwarding of incoming mobile telephone calls to said subscriber's wired line telephone;

receiving by CFADS said telephone call on said pre-specified de-activation telephone number;

de-activating said call forwarding of incoming mobile telephone calls for said mobile telephone to said wired line telephone by using Automatic Number Identification (ANI); and hanging up said wired line by said CPE cradle, having de-activated mobile telephone call forwarding to the home.

5. A method for providing wired line telephone and mobile telephone cross-usage comprising:

a) activating call forwarding of incoming wired line telephone calls to a subscriber's mobile telephone upon removal of said mobile telephone from a customer premises equipment (CPE) cradle, and b) de-activating call forwarding of incoming wired line telephone calls to the subscriber's mobile telephone upon placement of said mobile telephone into said CPE cradle, wherein de-activating call forwarding of incoming wired line telephone calls to said subscriber's mobile telephone further comprises:

detecting by said CPE cradle that said mobile telephone is in said CPE cradle when the mobile telephone unit is placed into the CPE cradle;

seizing a wired line by said CPE cradle by going off-hook;

placing a telephone call by said CPE cradle to the subscriber's Local Exchange Carrier (LEC) end office (EO);

communicating by said CPE cradle key sequences and a call forwarding telephone number that causes the LEC's existing call forwarding feature to be de-activated; and hanging up by said CPE cradle, having de-activated call forwarding to the mobile telephone, whereby incoming wired line telephone calls are thereupon directed to said wired line.

6. The method according to claim 5 further comprising:

activating call forwarding of incoming mobile telephone calls to a subscriber's wired line telephone upon placement of said mobile telephone into a customer premises equipment (CPE) cradle; and de-activating call forwarding of incoming mobile telephone calls to the subscriber's wired line telephone upon removal of said mobile telephone from said CPE cradle.

7. The method according to claim 6, wherein said activating call forwarding of incoming mobile telephone calls to said subscriber's wired line telephone further comprises:

detecting by said CPE cradle a placing of said mobile telephone in said CPE cradle when said mobile telephone is placed in said CPE cradle;

seizing by said CPE cradle a wired line;

placing by said CPE cradle a telephone call to a pre-specified activation telephone number to a Call Forwarding Activation De-Activation Server (CFADS) to activate call forwarding to the wired line telephone;

receiving by CFADS said telephone call from said CPE cradle on said pre-specified activation telephone number;

activating call forwarding of incoming calls to said mobile telephone to said wired line telephone using an Automatic Number Identification (ANI) by CFADS; and hanging up said wired line by said CPE cradle, having activated mobile telephone call forwarding to the home.

8. The method according to claim 6, wherein de-activating call forwarding of incoming mobile telephone calls to a subscriber's wired line telephone further comprises:

detecting by said CPE cradle a removal of said mobile telephone from said CPE cradle;

seizing a wired line by said CPE cradle;

dialing by said CPE cradle a pre-specified de-activation telephone number to a Call Forwarding Activation De-Activation Server (CFADS) in order to de-activate call forwarding of incoming mobile telephone calls to said subscriber's wired line telephone;

receiving by CFADS said telephone call on said pre-specified de-activation telephone number;

de-activating said call forwarding of incoming mobile telephone calls for said mobile telephone to said wired line telephone by using Automatic Number Identification (ANI); and hanging up said wired line by said CPE cradle, having de-activated mobile telephone call forwarding to the home.

* * * * *